United States Patent
Taniguchi et al.

(10) Patent No.: US 8,692,502 B2
(45) Date of Patent: Apr. 8, 2014

(54) ENCODER HAVING FUNCTION FOR DETECTING AMOUNT OF NOISE

(75) Inventors: Mitsuyuki Taniguchi, Minamitsuru-gun (JP); Hiroya Terashima, Minamitsuru-gun (JP); Hirofumi Kikuchi, Minamitsuru-gun (JP); Tokuhisa Matsukane, Minamitsuru-gun (JP)

(73) Assignee: Fanuc Corporation, Minamitsuru-gun, Yamanashi (JP)

( * ) Notice: Subject to any disclaimer, the term of this patent is extended or adjusted under 35 U.S.C. 154(b) by 362 days.

(21) Appl. No.: 13/173,438

(22) Filed: Jun. 30, 2011

(65) Prior Publication Data
US 2012/0013286 A1 Jan. 19, 2012

(30) Foreign Application Priority Data
Jul. 16, 2010 (JP) ................................. 2010-161669

(51) Int. Cl.
*G01D 3/00* (2006.01)
*G01D 5/12* (2006.01)

(52) U.S. Cl.
USPC .......................................... 318/602; 318/463

(58) Field of Classification Search
USPC ................. 318/456–458, 461–465, 475, 490, 318/600–605, 651, 661
See application file for complete search history.

(56) References Cited

U.S. PATENT DOCUMENTS

| 4,228,396 | A | * | 10/1980 | Palombo et al. | 324/163 |
| 4,789,874 | A | * | 12/1988 | Majette et al. | 347/37 |
| 4,882,529 | A | * | 11/1989 | Kobari et al. | 318/602 |
| 5,254,919 | A | * | 10/1993 | Bridges et al. | 318/560 |
| 5,324,934 | A | * | 6/1994 | Clark | 250/231.13 |
| 6,243,023 | B1 | * | 6/2001 | Katagiri | 340/870.03 |
| 7,247,839 | B2 | * | 7/2007 | Taniguchi et al. | 250/231.16 |

FOREIGN PATENT DOCUMENTS

| DE | 198 22 843 A1 | 11/1999 |
| JP | 2003-222518 A | 8/2003 |
| JP | 2005-172523 | 6/2005 |

* cited by examiner

*Primary Examiner* — Bentsu Ro
(74) *Attorney, Agent, or Firm* — Drinker Biddle & Reath LLP

(57) ABSTRACT

An encoder having a function for detecting noise which may affect an internal signal of the encoder, without using a noise detecting circuit within the encoder, whereby the cost and size thereof may be reduced. The encoder has a detecting part adapted to detect the movement of an electric motor or a driven object; a signal processing circuit adapted to process a detection signal from the detecting part and obtain positional data of the motor or the object; and a transmitting part adapted to transmit the positional data from the signal processing circuit at regular time intervals and a fluctuation component calculated on the basis of the positional data, to external equipment. The signal processing circuit has a fluctuation component detecting circuit adapted to detect a fluctuation comment included in the calculated positional data, and the detected fluctuation component is transmitted to the external controller as an amount of noise.

6 Claims, 3 Drawing Sheets

ENCODER HAVING FUNCTION FOR DETECTING AMOUNT OF NOISE

RELATED APPLICATIONS

The present application claims priority from Japanese Patent Application No. 2010-161669, filed on Jul. 16, 2010, the entire contents of which are fully incorporated herein by reference.

BACKGROUND OF THE INVENTION

1. Field of the Invention

The present invention relates to an encoder having a function for detecting an amount of noise which may affect an internal signal of the encoder.

2. Description of the Related Art

In the prior art, in order to measure an amount of noise in an encoder, it is necessary to arrange a device adapted to measure noise outside the encoder, or arrange a dedicated circuit adapted to measure noise within the encoder. For example, FIG. 12 of Japanese Unexamined Patent Publication (Kokai) No. 2005-172523 discloses a configuration having a voltage measuring means 104 adapted to measure a noise potential between a motor housing 13 and a circuit board (0V) within an encoder.

Further, FIG. 1 of Japanese Unexamined Patent Publication (Kokai) No. 2005-172523 discloses an encoder 1 having a detecting means 2 adapted to detect the movement of a movable body 10, a signal processing circuit 3 adapted to process a detection signal from detecting means 2 and output an encoder signal, and a noise detecting means 4 adapted to detect a noise component included in the detection signal, wherein detection means 2, signal processing means 3 and noise detecting means 4 are incorporated in the same apparatus. In encoder 1, a noise level may be determined by means of a coupling condenser adapted to extract an AC component from the detection signal and an A/D converting circuit adapted to determine the noise level based on the extracted AC component.

In the configuration as shown in FIG. 12 of Japanese Unexamined Patent Publication (Kokai) No. 2005-172523, it is necessary to arrange the voltage measuring means outside of the encoder, in order to measure the noise potential of the encoder. Therefore, it is difficult to always measure the noise potential.

On the other hand, when the dedicated circuit for measuring the noise is arranged within the encoder, the encoder is enlarged and the cost thereof is increased.

SUMMARY OF THE INVENTION

An object of the present invention is to provide an encoder having a function for detecting noise which may affect an internal signal of the encoder, without using a noise detecting circuit or the like within the encoder, whereby the cost and the size of the encoder may be reduced.

Accordingly, the invention provides an encoder attached to an electric motor or a driven body driven by the electric motor, the encoder comprising: a detecting part adapted to detect the movement of the electric motor or the driven body; a signal processing part adapted to process a detection signal from the detecting part so as to obtain positional data of the electric motor or the driven body; and a transmitting part adapted to transmit a fluctuation component to an external equipment, the fluctuation component being determined based on positional data (P(n)) obtained from the signal processing part at regular time intervals.

In a preferred embodiment, the fluctuation component is an absolute value of a differential value (X(n)) obtained by differentiating twice or more times the positional data (P(n)) obtained by the signal processing part at regular time intervals.

In this case, the fluctuation component may be a moving average of an absolute value of a differential value (X(n)) obtained by differentiating twice or more times the positional data (P(n)) obtained by the signal processing part at regular time intervals in relation to past several continuous data, or a value obtained by executing a filtering process in relation to the absolute value.

In another preferred embodiment, the fluctuation component is a difference between a moving average of an absolute value of a differential value (X(n)) obtained by differentiating twice or more times the positional data (P(n)) at regular time intervals in relation to past several continuous data, or a value obtained by executing a filtering process in relation to the differential value (X(n)), and the differential value (X(n)) obtained by differentiating twice or more times the positional data (P(n)).

In this case, a filtering process may be further executed in relation to a moving average of absolute values of the fluctuation component of past several continuous data, or in relation to absolute values of the fluctuation component of past several continuous data, a value obtained by the filtering process being determined as newly fluctuation component.

In another preferred embodiment, among values (X(n)) obtained by differentiating twice or more times the positional data (P(n)) obtained by the signal processing part at regular time intervals, two points (X(n−m), X(n+k)) which cooperatively define a line are determined, a time interval between the two points being longer than each time interval wherein the signal processing part calculates the positional data, and a difference, between a first value (X'(n)) on the line and a second value (X(n)) obtained by differentiating twice or more times the positional data at the same time of the first value (X'(n)), is determined as the fluctuation component.

In this case, a filtering process may be further executed in relation to a moving average of absolute values of the fluctuation component of past several continuous data, or in relation to absolute values of the fluctuation component of past several continuous data, a value obtained by the filtering process being determined as newly fluctuation component.

In another preferred embodiment, a peak value of values (X(n)) obtained by differentiating twice or more times the positional data (P(n)) obtained by the signal processing part at regular time intervals is determined as the fluctuation component, the peak value being determined in each predetermined period of time, and each predetermined period of time for the peak value being longer than each of the regular time intervals.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
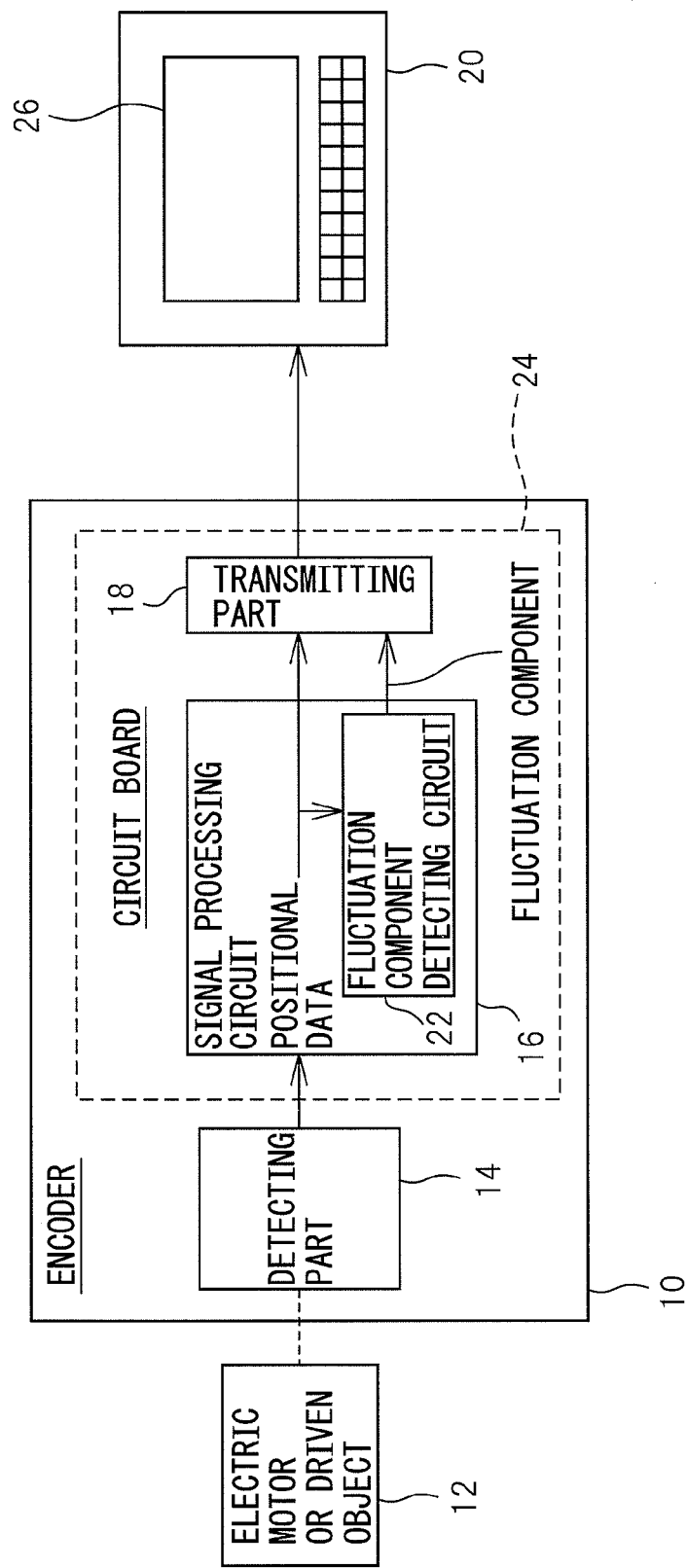
FIG. 1 shows a schematic configuration of an encoder of the invention, having a function for detecting an amount of noise.

FIG. 1 shows a schematic configuration of an encoder 10 of the invention, having a function for detecting an amount of noise. As encoder 10, various encoders such as a rotary encoder and a linear encoder may be used. Encoder 10 includes a detecting part 14 adapted to detect the movement of a measuring object, i.e., an electric motor or a driven body or object 12 driven by the electric motor; a signal processing part or circuit 16 adapted to process a detection signal from detecting part 14 and obtain positional data of the electric motor or driven object 12 (e.g., angular positional data of the electric motor or positional data of the driven object); and a transmitting part or circuit 18 adapted to transmit the positional data received from signal processing circuit 16 at regular time intervals and a fluctuation component calculated on the basis of the positional data, to external equipment such as an external controller 20.

Signal processing circuit 16 is adapted to calculate the positional data of the electric motor or driven object 12 from detecting part 14 at regular time intervals, and output the calculated positional data to transmitting part 18. Signal processing part 16 has a fluctuation component detecting circuit 22 adapted to detect a fluctuation comment included in the calculated positional data. The fluctuation component detected by fluctuation component detecting circuit 22 is outputted to transmitting part 18, and then is transmitted from transmitting part 18 to external controller 20 as an amount of noise. As in the embodiment, signal processing part 16 including the fluctuation component detecting circuit and transmitting part 18 may be arranged in one circuit board 24.

External controller 20 is adapted to generate an alarm when the amount of noise from transmitting part 18 exceeds a predetermined threshold, whereby an operator can take appropriate action before a system including encoder 10 is stopped due to the influence of the noise. External controller 20 may have an indicating part 26 such as a display adapted to indicate the amount of noise, whereby the amount of noise may be monitored and protection against noise may be confirmed.

Figure 2:
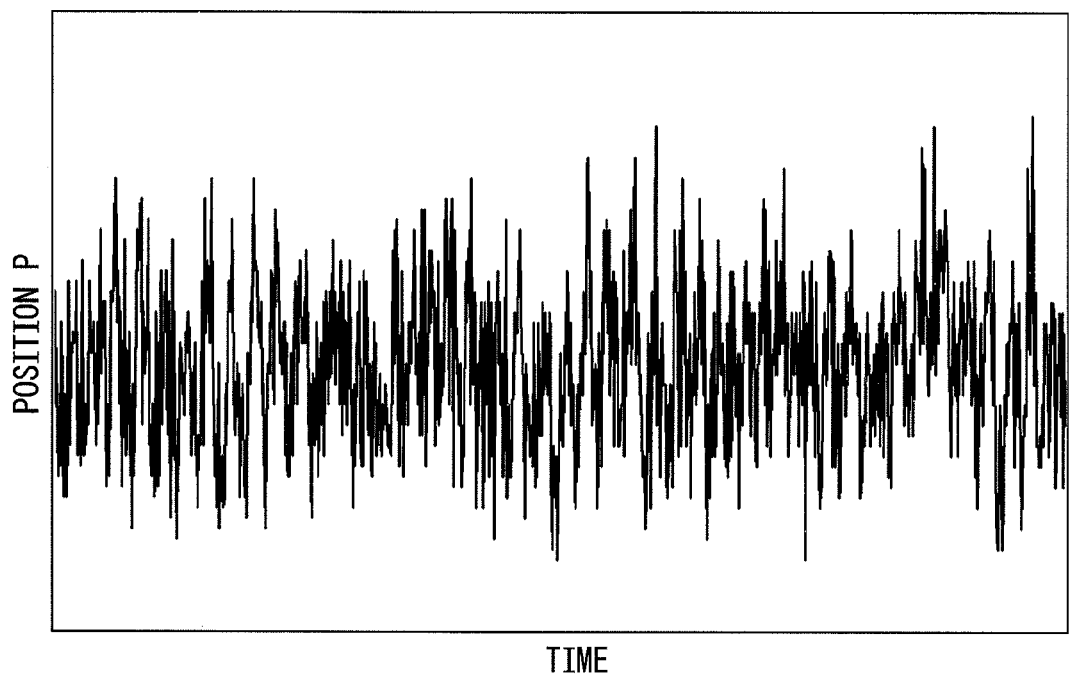
FIG. 2 is a graph indicating one example of positional data obtained at regular time intervals.

Next, a concrete calculation in the signal processing circuit will be explained. As shown in FIG. 2, positional data P(n) calculated by signal processing circuit 16 at regular time intervals fluctuate due to the influence of the noise. In the embodiment, a fluctuation component of the positional data means a value calculated on the basis of value X(n) obtained by differentiating twice or more times positional data P(n) calculated by signal processing circuit 16 at regular time intervals.

Figure 3:
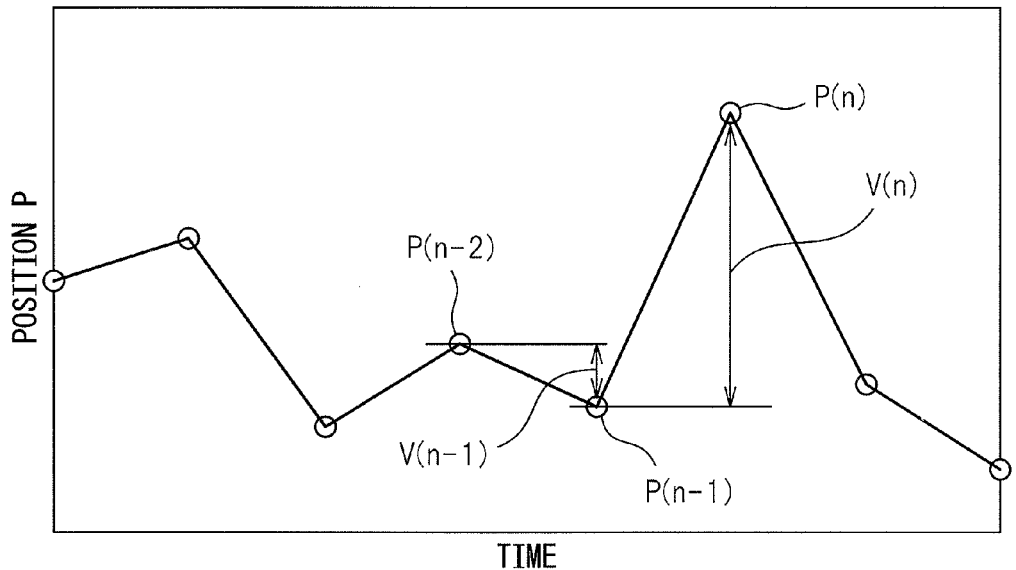
FIG. 3 is an enlarged view wherein a part of the graph of FIG. 2 is enlarged in a time axis direction.

As shown in FIG. 3 wherein a part of the positional data of FIG. 2 is enlarged in the direction of a time axis (or a horizontal axis), "first order differential" means calculating differential data V(n) between one positional datum P(n) and just before positional datum P(n−1) (for example, before one sampling period). Therefore, second order differential means calculating a difference between V(n) and V(n−1) which corresponds a difference between P(n−1) and P(n−2) just before P(n−1). Similarly, third order differential, fourth order differential and more order differential can be calculated by repeating the similar calculation.

It is possible to use differential data V(n) obtained by the first order differential as the amount of noise. However, when the electric motor or the driven object is moved, the fluctuation due to the noise and the change in a value due to the movement cannot be distinguished on the basis of a value obtained by the first order differential. Therefore, it is necessary to use an absolute value of a value (hereinafter, referred to as X(n)) obtained by the second or more order differential (or by differentiating twice or more times).

Alternatively, it is possible to calculate absolute values of values X(n) obtained by differentiating twice or more times positional data P(n) calculated by signal processing circuit 16 at regular time intervals, calculate a moving average of continuous absolute values or execute a filtering process in relation to the continuous absolute values, and determine the moving average or a value obtained by the filtering process as the fluctuation component. When the moving average is used, an average of past m-numbers absolute values is determined as the fluctuation component or the amount of noise. On the other hand, as one example of the filtering process, the following equation (1) may be used.

$$Y(n) = |X(n)|/m + Y(n-1) \times (m-1)/m \qquad (1)$$

In this regard, Y(n) is a fluctuation component to be calculated in this period, Y(n−1) is a fluctuation component calculated in previous period, |X(n)| is an absolute value of a value obtained by differentiating twice or more times positional data P(n) in this period.

In X(n) obtained by differentiating twice or more times positional data P(n) calculated by signal processing circuit 16 at regular time intervals, an acceleration value during acceleration or deceleration may be included. Since a frequency of the acceleration value is lower than that of the noise to be calculated, the acceleration value can be distinguished from the noise by the calculation of the moving average or the filtering process in relation to the past continuous data. Therefore, when a value, obtained by subtracting the moving average or the value obtained by the filtering process from X(n), is determined as the fluctuation component, the influence of the above acceleration may be eliminated and the amount of noise may be correctly calculated. Similarly, in relation to a jerk value included in X(n) obtained by differentiating three-times positional data P(n), the influence of the jerk value may be eliminated by the similar process as described above. In addition, since the calculation of the moving average and the filtering process may be executed by a known method, the details thereof omitted.

Figure 4:
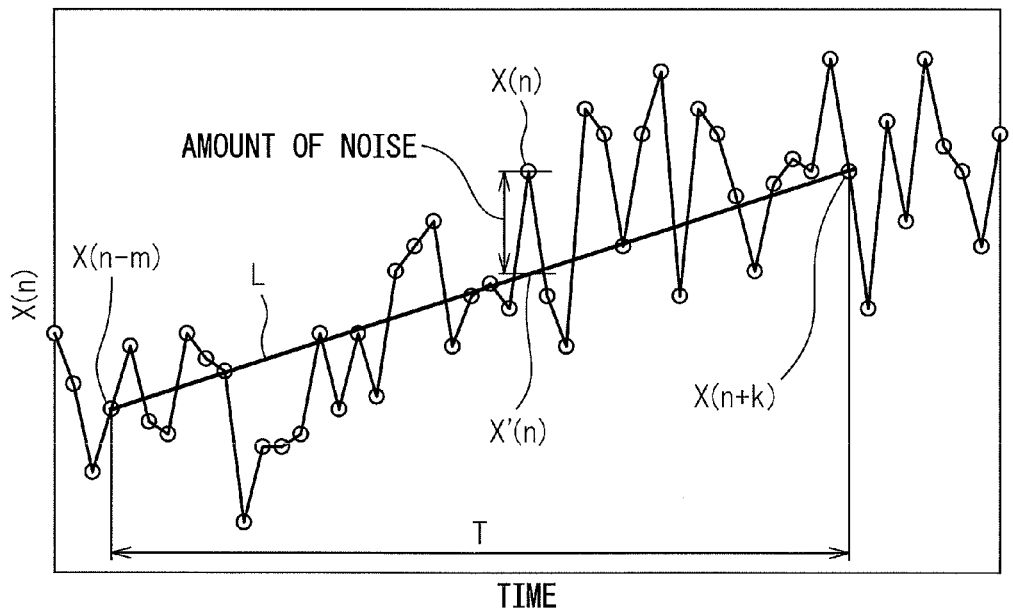
FIG. 4 is a graph indicating values obtained by differentiating twice or more times the positional data of FIG. 2.

The acceleration value as described above may also be calculated by the following process. First, as shown in FIG. 4, among data X(n) obtained by differentiating twice or more times positional data P(n) calculated by signal processing circuit 16 at regular time intervals, two points or data X(n−m) and X(n+k) which cooperatively define a line "L" are determined, a time interval "T" between the two points being longer than each time interval (for example, between X(n) and X(n−1)) wherein signal processing circuit calculates the positional data, and then a value X'(n) on line "L" is determined. When a difference, between X'(n) and X(n) obtained by differentiating twice or more times the positional data at the same time of X'(n), is determined as the fluctuation component, the influence due to the acceleration may be eliminated.

In relation to absolute values of the fluctuation component obtained by subtracting the moving average or the value obtained by the filtering process from X(n), or absolute values of the fluctuation component obtained by subtracting X'(n) from X(n), the calculation of the moving average or the filtering process may be further executed, and the obtained values may be determined as a newly fluctuation component.

The calculation of the moving average and the filtering process may also be executed by a known method.

Otherwise, a peak value (or a maximum value) of X(n) obtained by differentiating twice or more times positional data P(n) calculated by signal processing circuit 16 at regular time intervals may be determined as the fluctuation component. Concretely, holding (or storing) and resetting each peak value are repeated at predetermined period of time, and a peak value in each period of time is determined as the fluctuation component. In this regard, it is necessary that the period of time for determining the peak value be sufficiently longer than the predetermined time interval for calculating the positional data.

According to the present invention, the fluctuation component is calculated based on the positional data calculated by the signal processing circuit, and the fluctuation component is outputted to the external equipment as the amount of noise. Therefore, external voltage measuring means or a dedicated noise detecting circuit is not necessary, whereby the amount of noise can be always and correctly measured by using a low-cost and compact encoder.

As the fluctuation component, a value, calculated by using the value obtained by differentiating twice or more times the positional data calculated by the signal processing part at regular time intervals, may be used. Therefore, complex calculation is not necessary, whereby a computation load of the signal processing part does not excessively increase.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An encoder attached to an electric motor or a driven body driven by the electric motor, the encoder comprising:
 a detecting part adapted to detect the movement of the electric motor or the driven body;
 a signal processing part adapted to process a detection signal from the detecting part so as to obtain positional data of the electric motor or the driven body; and
 a transmitting part adapted to transmit a fluctuation component to an external equipment, the fluctuation component being determined based on positional data (P(n)) obtained from the signal processing part at regular time intervals,
 wherein the fluctuation component is an absolute value of a differential value (X(n)) obtained by differentiating twice or more times the positional data (P(n)) obtained by the signal processing part at regular time intervals, and
 wherein the fluctuation component is a moving average of an absolute value of a differential value (X(n)) obtained by differentiating twice or more times the positional data (P(n)) obtained by the signal processing part at regular time intervals in relation to past several continuous data, or a value obtained by executing a filtering process in relation to the absolute value.

2. An encoder attached to an electric motor or a driven body driven by the electric motor, the encoder comprising:
 a detecting part adapted to detect the movement of the electric motor or the driven body;
 a signal processing part adapted to process a detection signal from the detecting part so as to obtain positional data of the electric motor or the driven body; and
 a transmitting part adapted to transmit a fluctuation component to an external equipment, the fluctuation component being determined based on positional data (P(n)) obtained from the signal processing part at regular time intervals,
 wherein the fluctuation component is a difference between a moving average of an absolute value of a differential value (X(n)) obtained by differentiating twice or more times the positional data (P(n)) at regular time intervals in relation to past several continuous data, or a value obtained by executing a filtering process in relation to the differential value (X(n)), and the differential value (X(n)) obtained by differentiating twice or more times the positional data (P(n)).

3. The encoder as set forth in claim 2, wherein a filtering process is further executed in relation to a moving average of absolute values of the fluctuation component of past several continuous data, or in relation to absolute values of the fluctuation component of past several continuous data, a value obtained by the filtering process being determined as newly fluctuation component.

4. An encoder attached to an electric motor or a driven body driven by the electric motor, the encoder comprising:
 a detecting part adapted to detect the movement of the electric motor or the driven body;
 a signal processing part adapted to process a detection signal from the detecting part so as to obtain positional data of the electric motor or the driven body; and
 a transmitting part adapted to transmit a fluctuation component to an external equipment, the fluctuation component being determined based on positional data (P(n)) obtained from the signal processing part at regular time intervals,
 wherein, among values (X(n)) obtained by differentiating twice or more times the positional data (P(n)) obtained by the signal processing part at regular time intervals, two points (X(n−m), X(n+k)) which cooperatively define a line are determined, a time interval between the two points being longer than each time interval wherein the signal processing part calculates the positional data, and a difference, between a first value (X'(n)) on the line and a second value (X(n)) obtained by differentiating twice or more times the positional data at the same time of the first value (X'(n)), is determined as the fluctuation component.

5. The encoder as set forth in claim 4, wherein a filtering process is further executed in relation to a moving average of absolute values of the fluctuation component of past several continuous data, or in relation to absolute values of the fluctuation component of past several continuous data, a value obtained by the filtering process being determined as newly fluctuation component.

6. An encoder attached to an electric motor or a driven body driven by the electric motor, the encoder comprising:
 a detecting part adapted to detect the movement of the electric motor or the driven body;
 a signal processing part adapted to process a detection signal from the detecting part so as to obtain positional data of the electric motor or the driven body; and
 a transmitting part adapted to transmit a fluctuation component to an external equipment, the fluctuation component being determined based on positional data (P(n)) obtained from the signal processing part at regular time intervals,
 wherein a peak value of values (X(n)) obtained by differentiating twice or more times the positional data (P(n)) obtained by the signal processing part at regular time intervals is determined as the fluctuation component, the peak value being determined in each predetermined period of time, and each predetermined period of time for the peak value being longer than each of the regular time intervals.

* * * * *